United States Patent [19]

Bueschl et al.

[11] Patent Number: 4,952,654
[45] Date of Patent: Aug. 28, 1990

[54] HEAT DISTORTION RESISTANT, TRANSPARENT THERMOPLASTIC MOLDING MATERIAL, ITS PREPARATION AND ITS USE

[75] Inventors: Rainer Bueschl, Roedersheim-Gronau; Adolf Echte; Juergen Mertes, both of Ludwigshafen, all of Fed. Rep. of Germany

[73] Assignee: BASF Aktiengesellschaft, Ludwigshafen, Fed. Rep. of Germany

[21] Appl. No.: 324,015

[22] Filed: Mar. 16, 1989

[30] Foreign Application Priority Data

Mar. 31, 1988 [DE] Fed. Rep. of Germany ....... 3811053

[51] Int. Cl.$^5$ ............................................. C08F 218/02
[52] U.S. Cl. .................................................. 526/307.7
[58] Field of Search ....................................... 526/307.7

[56] References Cited

U.S. PATENT DOCUMENTS 4,151,333 4/1979 Lenke et al. ..................... 526/307.7

FOREIGN PATENT DOCUMENTS 467402 6/1937 United Kingdom ............. 526/307.7

*Primary Examiner*—Joseph L. Schofer
*Assistant Examiner*—N. Sarofin
*Attorney, Agent, or Firm*—Oblon, Spivak, McClelland, Maier & Neustadt

[57] ABSTRACT

A heat distortion resistant, transparent thermoplastic molding material contains a copolymer of the monomers
(a) methyl methacrylate and
(b) an N-substituted amide of methacrylic acid.

The molding material contains from 5 to 95% by weight of monomer (a) and from 95 to 5% by weight of monomer or monomers (b), the percentages being based on (a)+(b), and furthermore, as monomer (b), and N-substituted amide of the formula

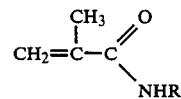

where R is a primary, secondary or tertiary alkyl radical, cycloalkyl, aryl or aralkyl of 2 to 12 carbon atoms.

The molding material is used for the production of heat distortion resistant moldings or laminates.

6 Claims, No Drawings

HEAT DISTORTION RESISTANT, TRANSPARENT THERMOPLASTIC MOLDING MATERIAL, ITS PREPARATION AND ITS USE

The present invention relates to a heat distortion resistant, transparent thermoplastic molding material containing a copolymer of the copolymerized monomers
  (a) methyl methacrylate and
  (b) one or more N-substituted amides of methacrylic acid.

The relevant prior art includes
  (1) J 60 020 904,
  (2) J 58 042 668,
  (3) J 61 247 716,
  (4) German Laid-Open Application DOS No. 3,438,432 and
  (5) U.S. Pat. No. 2,311,548.

Various methods have been proposed for improving the heat distortion resistance of PMMA, for example copolymerization with
  (a) a-methylstyrene (a-MS, cf. U.S. Pat. No. 3,072,622) or
  (b) maleic anhydride (MA, cf. European Patent No. 124,273) or
  (c) the amidation or imidation of polymethyl methacrylate (PMMA, cf. European Patent No. 216,505).

The process of U.S. Pat. No. 3,072,622 has disadvantages, for example a limited increase in the heat distortion resistance, which, as described there, becomes a plateau at as low as about 30% of a-MS.

Moreover, high proportions of a-methylstyrene very greatly reduce the rate of polymerization (Ito et al., Polymer Journal, 18, No. 9 (1986), 667–672), so that the method is not economical.

In the process of EP-A-No. 124,273, the copolymerization parameters are so disadvantageous that copolymerization with only a few percent of MSA in a batchwise polymerization procedure leads to incompatibility and hence to mechanically poor products. In every case, only small proportions of MA can be introduced in the continuous procedure. In order to avoid this, continuous or batchwise terpolymerization with styrene is used.

This process thus requires styrene (or possibly another component) as a comonomer in an amount which once again has an adverse effect on the product properties, for example reducing the scratch resistance or the high weather stability typical of PMMA. As mentioned above, the amount of maleic anhydride which can be copolymerized is limited by the unfavorable copolymerization behavior, and a technically complicated procedure is required in some cases.

The processes stated under (c) have the disadvantage that, in order to prepare these PMMA molding materials having increased heat distortion resistance, in addition to the polymerization of MMA a further expensive step is required, which makes the end product more expensive. Furthermore, the pale yellowish coloration of the resulting products presents problems.

(1) describes thermoplastic polymers which have good heat distortion resistance and high transparency and undergo an intramolecular cyclization reaction to give N-substituted glutarimide groups. The cyclization takes place via an intermediate, a copolymer of MMA and N-methyl methacrylate, no information being given about the properties of the intermediate. Copolymers of MMA and N-methylmethacrylamide are also described in (5).

(2) describes a dirt-repellent paint based on (meth)acrylamide-containing copolymers. Comonomers which may be used include alkyl (meth)acrylates.

(3) describes, inter alia, an N-(meth)acrylamide-containing heat-sensitive polymer emulsion. One of the comonomers listed is MMA. These polymer emulsions have better light transmittance at elevated temperatures.

(4) describes water-removing agents consisting of, inter alia, copolymers which contain, for example, from 1 to 15% by weight of MMA and from 99 to 85% by weight of N-acryloylpyrrolidone. These resins have a water absorption capacity which is dependent on temperature and shrink when heated.

It is an object of the present invention, compared with the prior art stated under (a) to (c), to provide a molding material which has a higher heat distortion resistance and which, regardless of the preparation process (continuous or batchwise), is transparent or clear. It is therefore necessary to provide a comonomer which makes it possible to retain the good transparency familiar for PMMA and further improves the good heat distortion resistance of PMMA. The prior art stated under (1) to (5) does not provide the skilled worker with any ideas in connection with the processes (a) to (c).

We have found that this object is achieved by a molding material as claimed in claim 1.

The present invention relates to a heat distortion resistant, transparent, thermoplastic molding material, i.e. a copolymer of the monomers
  (a) methyl methacrylate and
  (b) one or more N-substituted amides of methacrylic acid.

The molding material contains from 5 to 95% by weight of monomer (a) and from 95 to 5% by weight of monomer or monomers, (b), the percentages being based on (a)+(b), and contains, according to the invention, as monomer (b), an N-substituted amide of the formula

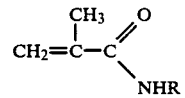

where R is a primary, secondary or tertiary alkyl radical, cycloalkyl, aryl or aryalkyl of 2 or 6 or 7, respectively, to 12 carbon atoms.

When the monomers (b) are used, the novel molding material shows good copolymerization behavior (with regard to transparency and reaction rate) and has high heat distortion resistance, in contrast to the molding materials consisting of MMA with the comonomers MA, a-methylstyrene or imides, even when prepared by a batchwise procedure.

The composition of the novel molding material and its preparation are described below.

The molding material contains a copolymer of the monomers (a) MMA and (b) one or more N-substituted methacrylamides. The stated monomers are present in the copolymer in the following percentages by weight, based in each case on (a)+(b):
  from 5 to 95, preferably from 10 to 90, % by weight of (a) and from 95 to 5, preferably from 90 to 10, % by weight of (b).

From 0.01 to 50 parts by weight of conventional additives may be present in the molding material per 100 parts by weight of the terpolymer. Composition of the copolymer The copolymer contains the monomers (a) and (b) copolymerized in random distribution.

A preferred monomer (b) is a methacrylamide whose substituent R is ethyl, isopropyl, tert-butyl, cyclohexyl, benzyl or phenyl.

The monomers (a) to (b) need not be the only monomers of which the copolymer consists; other monomers which differ from (a) and (b) may also be present in the copolymer.

PREPARATION OF THE NOVEL MOLDING MATERIAL

The novel molding material can be prepared by free radical or thermal polymerization, continuously or batchwise. This polymerization can be carried out as mass (solution) polymerization, mass-suspension polymerization, emulsion polymerization or suspension polymerization.

In the individual processes, the conventional assistants known for the preparation of PMMA, polystyrene, SAN or copolymers or for the copolymers disclosed in (1) to (4), e.g. initiators, regulators, emulsifiers, protective colloids, etc., are used in conventional amounts.

The mass polymerization of styrene and N-substituted methacrylamides is carried out using free radical initiators.

When initiation is effected with a free radical initiator, for example, a monomer mixture consisting of 60 parts by weight of styrene and 40 parts by weight of N-phenylacrylamide is heated to 60°–180° C., preferably 100°–150° C., in a continuous-flow stirred kettle and is polymerized at this temperature until conversions of about 40–50% are reached. The resulting heat of polymerization can be removed by evaporative cooling of the methyl methacrylate. It is also possible for the polymer syrup to be circulated through heat exchangers which are outside the kettle and in which the heat of polymerization can then be removed.

The polymer syrup containing about 45% by weight of copolymer can be separated into unconverted monomers and polymer melt at from 230° to 300° C. in devolatilization units, as disclosed in U.S. Pat. No. 2,941,986, or in conventional devolatilization extruders. The monomers recovered can be recycled to the polymerization kettle.

Initiation of the copolymerization with free radical initiators, for example peresters, acyl peroxides, peroxides, peroxydicarbonates or azo initiators, such as AIBN, permits lower polymerization temperatures. For example, a polymer conversion of 45% can be achieved at as low as 80° C. by continuously metering tert-butyl perpivalate into the polymerization kettle. The molecular weight can be regulated, inter alia, by using mercaptans. The polymer syrup is worked up in the same way as in the thermal procedure.

The use of solvents, for example ethylbenzene, toluene, xylene, cumene, acetone, methyl ethyl ketone or tetrahydrofuran, to mention but a few, permits a higher polymerization conversion in the reaction kettle without the viscosities of the reaction mixture becoming uncontrollably high. Solvents can be used both in the thermal procedure and in the procedure employing an initiator.

Mass-suspension polymerization is carried out, in particular, batchwise. Up to a polymer conversion of from 30 to 40%, the procedure employed is free radical mass polymerization at from 60° to 160° C. After the stated conversion has been reached, 2 g of dicumyl peroxide and a solution of 2 l of water, 50 g of polyvinyl alcohol, 18 g of polyvinylpyrrolidone and 1.8 g of $Na_4P_2O_7$ are added to 2 l of the polymer syrup, and polymerization is continued to a conversion of 98–100%, using the following temperature program:
3 hours at 110° C.
3 hours at 130° C.
3 hours at 150° C.
3 hours at 180° C.

The suspension polymerization can be carried out in a conventional manner using a protective colloid. Methyl methacrylate and N-phenylmethacrylamide are weighed in together with water, sodium pyrophosphate, tert-butyl perbenzoate, benzoyl peroxide and tertdodecylmercaptan; the kettle is flushed with $N_2$ and is heated to 80° C. in the course of half an hour while stirring at 300 revolutions per minute. The reaction mixture is kept at this temperature for 3 hours, after which polyvinyl-pyrrolidine and polyvinyl alcohol are dissolved in water added, and the polymerization is continued for 2 hours at 90° C. Thereafter, polymerization is continued for 2 hours at 130° C., for 2 hours at 150° C. and for 2 hours at 180° C. After cooling, the beads are sieved, washed and dried.

For the emulsion polymerization, styrene, N-phenylmethacrylamide, water, sodium dodecylsulfonate and potassium peroxydisulfate are predispersed using an Ultraturrax. The emulsion is introduced into a kettle equipped with a stirrer, a reflux condenser, a thermometer and a nitrogen connection, and the air is displaced with nitrogen. The emulsion is then heated to 70° C. on a water bath with slow stirring, and, after the polymerization has begun, it is continued for a further 3 hours at 70° C. The dispersion is then polymerized at 80° C. After cooling, the dispersion is coagulated with acetic acid, and the polymer is separated off in a centrifuge, washed, and fed as a moist mass to a devolatilization extruder. The residual water and unconverted monomer can be removed here. The polymer melt is extruded through a die plate and the extrudates are granulated to give cylindrical granules.

Conventional additives can be used during the polymerization itself or afterward. Examples of additives are lubricants, mold release agents, antioxidants, antistatic agents, pigments, dyes, fillers, such as glass fibers, carbon fibers or metals in flake, fiber or powder form, and flameproofing agents.

It is also possible to blend the novel molding material with other thermoplastics and, if desired, to produce moldings or laminates with other thermoplastics. The choice of thermoplastics depends on the field of use familiar to the skilled worker.

Incorporation of the additives after the polymerization is effected by a conventional mixing procedure at from 200° to 300° C. in a conventional mixer, kneader, roll mill or extruder.

The novel molding materials can be processed by the known methods for processing thermoplastics, for example by extrusion, injection molding, calendering, blow molding, pressing or sintering; the novel molding materials are particularly preferably used for the injection molding of shaped articles for containers and lids for kitchen appliances, instrument and lamp covers for the automotive industry, packaging materials, etc.

The novel molding material is preferably used for the production of shaped articles which come into contact with liquids or gases at high temperatures, for example pipes for hot wastewaters or hot liquids which are at temperatures of up to 150° or 170° C. It may also be used for containers for microwave apparatuses.

The parameters described in this patent are determined as follows:
1. The glass transition temperature, Tg, is determined by the DSC method (ASTM D 3418-82).
2. The viscosity number, VN, is measured similarly to DIN 53,726, in 0.5% strength solution in chloroform at 23° C.
3. The melt flow index, MFI, is determined similarly to DIN 53,735 at 200° C. and under a load of 21.6 kp and expressed in g/10 min.
4. The transparency is determined by visual evaluation of the 1 mm thick pressed plates.

The monomers (b) required for carrying out the polymerization as described in the Examples were obtained by reacting methacrylic acid (ester or chloride) with a primary or secondary amine. DE 31 23 970 gives an overview of synthetic methods which can also be carried out on an industrial scale. The methacrylamides used here all had purities of >99%.

The Examples and several Comparative Experiments which follow illustrate the invention. In the Examples, parts and percentages are by weight, unless stated otherwise.

EXAMPLES 1 TO 12 AND COMPARATIVE EXPERIMENTS I AND II

The copolymers described in Tables 1 and 2 were prepared by mass polymerization in a pressure reactor.

The N-substituted methacrylamides were dissolved at 60° C. in the stated amount of MMA, and 0.2 part by weight of benzoyl peroxide, 0.1 part by weight of dicumyl peroxide and 0.3 part by weight of tert-dodecylmercaptan were added. 80 ml of this solution was introduced into a pressure reactor, and flushing of the said reactor with nitrogen and devolatilization under reduced pressure were carried out alternately. Polymerization was then continued under a nitrogen atmosphere until virtually complete conversion. The polymerization was effected for 24 hours at 80° C., for 8 hours at 120° C. and for 8 hours at 170° C.

10% strength solutions of the methylene chloride-soluble polymers were prepared, and the polymers were precipitated with a 6-fold excess of ethanol, filtered off, and dried under reduced pressure at 150° C. for 12 hours. The Tg measurements (DSC method) were carried out on circular disks produced at 200° C.

Polymers insoluble in methylene chloride were freed from residual monomers in a drying gun (213° C., 10 mmHg, 40 min). In this case too, the Tg measurement was carried out on circular disks produced at 200° C.

The Tables show the composition, the glass transition temperature, Tg, as a measure of the heat distortion resistance, the viscosity numbers and the melt flow indices of the copolymers.

Comparative Experiment I represents the starting point with regard to the object of increasing the heat distortion resistance. By way of explanation, it should be noted that the glass transition temperatures stated in the Tables are somewhat higher than the Vicat temperatures.

Comparative Experiment II corresponds to the prior art according to publication (1), and it should be pointed out that the heat distortion resistance is not mentioned, and was also not determined, in (1).

Copolymers of MMA and, for example, 70% by weight of N-methylmethacrylamide (MMAA) have a Tg of 171° C., while those containing 60% of MMAA have a Tg of about 160° C. (both products are insoluble). Within the claimed range, it is possible to prepare molding materials having very good melt flow, i.e. good processibility (R=benzyl), or those having reduced water absorption (R=phenyl).

TABLE 1

Copolymers of MMA and N-benzylmethacrylamide (BzMMA)

| | MMA (% by weight) | BzMMA (% by (weight) | Tg by DSC (°C.) | Solubility in CHCl₃ | VN | MFI | Transparency |
|---|---|---|---|---|---|---|---|
| Example | | | | | | | |
| 1 | 90 | 10 | 119 | Good | 76 | 17.7 | Clear |
| 2 | 80 | 20 | 124 | Good | 72 | 15.8 | Clear |
| 3 | 60 | 40 | 131 | Good | 73 | 12.4 | Clear |
| 4 | 40 | 60 | 136 | Good | 68 | 10.1 | Clear |
| Comparative Experiment | | | | | | | |
| I | 100 | — | 115 | Good | 78 | 18.5 | Clear |
| II | 50 | 50* | 152 | Insoluble | 8.2 | | |

*MMAA

TABLE 2

Copolymers of methyl methacrylate (MMA) and N-phenylmethacrylamide (PhMMA)

| Example | MMA (% by weight) | PhMMA (% by weight) | Tg by DSC (°C.) | Solubility in CHCl₃ | VN | MFI | Transparency |
|---|---|---|---|---|---|---|---|
| 5 | 90 | 10 | 119 | Good | 65.3 | 12.5 | Clear |
| 6 | 80 | 20 | 126 | Good | 61.4 | 11.4 | Clear |
| 7 | 70 | 30 | 135 | Good | 56.2 | 10.4 | Clear |
| 8 | 60 | 40 | 142 | Good | 58.9 | 9.8 | Clear |
| 9 | 50 | 50 | 150 | Good | 52.7 | 7.6 | Clear |
| 10 | 40 | 60 | 159 | Good | 56.3 | 5.4 | Clear |
| 11 | 30 | 70 | 165 | Good | 55.3 | 4.9 | Clear |
| 12 | 20 | 80 | 174 | Good | 50.5 | 3.9 | Clear |

We claim:
1. A heat distortion resistant, transparent thermoplastic molding material, a copolymer of the monomers
(a) methyl methacrylate and
(b) an N-substituted amide of methacrylic acid, containing
from 5 to 95% by weight of monomer (a) and
from 95 to 5% by weight of monomer (b),
the percentages being based on (a)+(b), wherein monomer (b) used is an N-substituted amide of the formula (I)

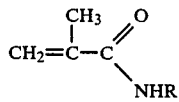

where R is a primary, secondary or tertiary alkyl radical of 2 to 12 carbon atoms, cycloalkyl, aryl or aralkyl of 2 or 6 or 7, respectively, to 12 carbon atoms.

2. A molding material as claimed in claim 1, containing from 0.01 to 50 parts by weight of conventional additives per 100 parts by weight of the copolymer.

3. A molding material as claimed in claim 1, containing a copolymer of
from 10 to 90% by weight of monomer (a) and
from 90 to 10% by weight of monomer (b).

4. A molding material as claimed in claim 1, containing, as monomer (b), a compound (I) whose substituent R is ethyl, isopropyl, tert-butyl, cyclohexyl, phenyl or benzyl.

5. A molding material as claimed in claim 1, wherein R is phenyl.

6. A process for the preparation of a molding material as claimed in claim 1 by continuous or batchwise free radical and/or thermal polymerization of the recited monomers.

* * * * *